United States Patent [19]
Peterson

[11] 4,274,492
[45] Jun. 23, 1981

[54] FOLDABLE DEVICE FOR TRANSPORTING FARM IMPLEMENTS

[76] Inventor: Harold B. Peterson, R.R. 2, Larchwood, Iowa 51241

[21] Appl. No.: 62,909

[22] Filed: Aug. 2, 1979

[51] Int. Cl.³ .................. A01B 73/00; A01B 69/08
[52] U.S. Cl. ............................... 172/285; 172/654; 172/311; 172/645; 172/581
[58] Field of Search .............. 172/285, 282, 283, 284, 172/291, 288, 289, 311, 456, 489, 654, 656, 617, 616, 640, 641, 645, 630, 662, 581

[56] References Cited
U.S. PATENT DOCUMENTS

| | | | |
|---|---|---|---|
| 863,948 | 8/1907 | Spence | 172/654 |
| 3,589,451 | 6/1971 | Wenzel | 172/285 |
| 3,677,349 | 7/1972 | Gugin | 172/285 |
| 4,194,573 | 3/1980 | Rettkowski | 172/662 X |

Primary Examiner—George J. Marlo

[57] ABSTRACT

A device to provide for easy handling of dual tandem discs and similar farm implements. The device is a framework foldable on a hinge line and having wheels for transportation. The hinge line is longitudinal and provides that when collapsed, the two tandem discs are carried in line with a minimal width and when open allows the discs to be pulled in a side by side conformation to cover two parallel paths.

9 Claims, 5 Drawing Figures

FOLDABLE DEVICE FOR TRANSPORTING FARM IMPLEMENTS

BACKGROUND AND SUMMARY OF THE INVENTION

Modern farm machinery has tended to become larger as tractive means have increased in power. It is now fairly common to prepare a seed bed by plowing with wide, multi-bottomed plows and to disc a wide path by some means using side by side disc units.

While usage of such units in a field is readily accomplished, the transportation of such units to and from the field becomes a problem by reason of their width which becomes almost prohibitive.

Several means of transport have been proposed. Perhaps the most common is a system by which the outer discs are tilted upward and are carried in a vertical position. This requires considerable energy to lift the sections and to hold them in place. Another method has been proposed by which the disc is turned ninety degrees and is transported in a direction perpendicular to the direction it travels in use. This often requires a clumsy unhitching-rehitching cycle to change from one pulling hitch to the other.

Both of the previously described devices use a single implement specifically designed for larger machinery. My device allows the use of a pair of older, or smaller discs arranged to be pulled side by side in the field and then in tandem fashion on the road. Also, I provide for steering the device from just in front of both disc devices so that there is better trailing of the two discs on the road or lane. All of this is accomplished by providing a collapsing frame as illustrated in the figures and described in the following specification.

FIGURES

Figure 1:
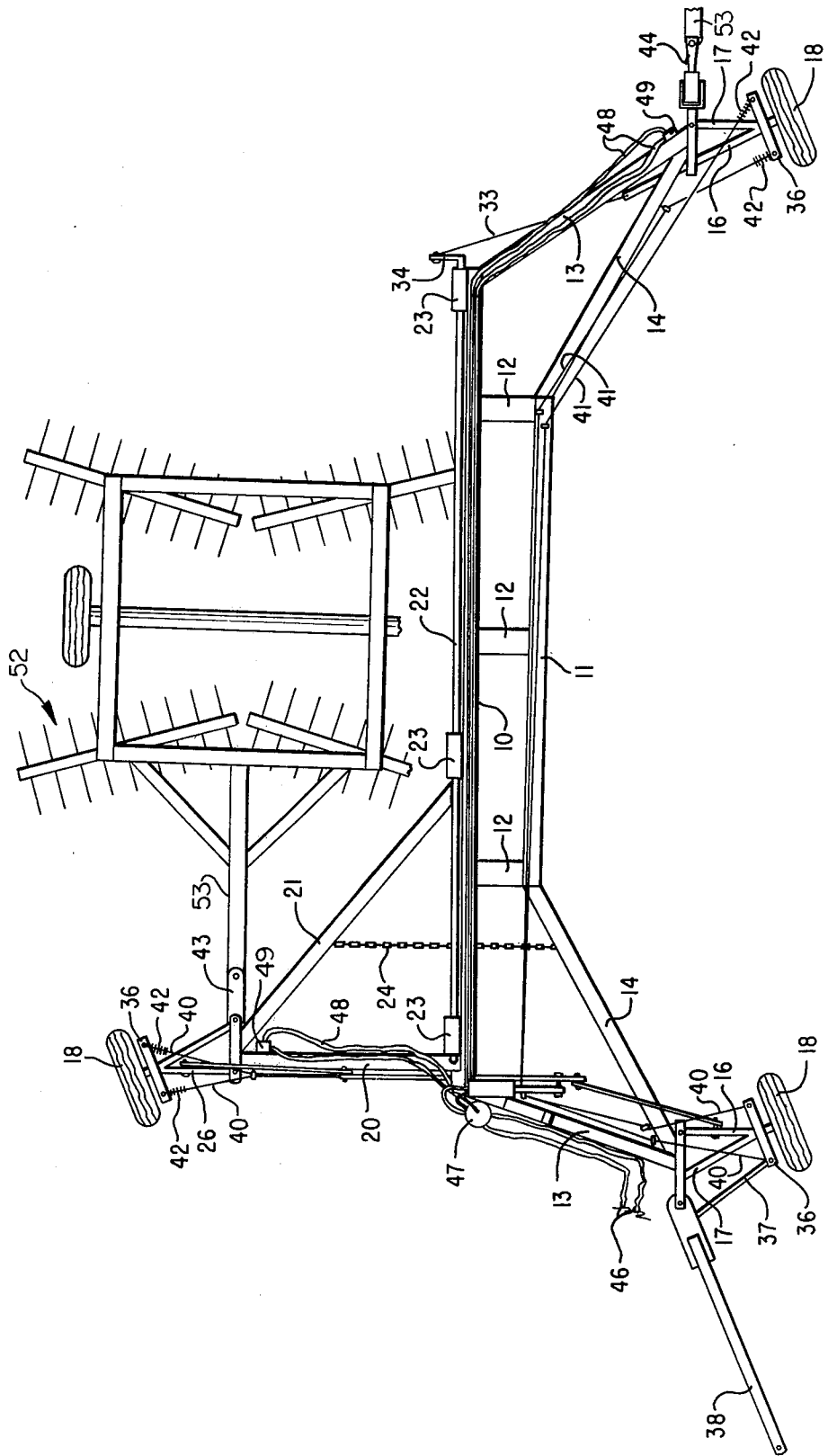
Figure 2:
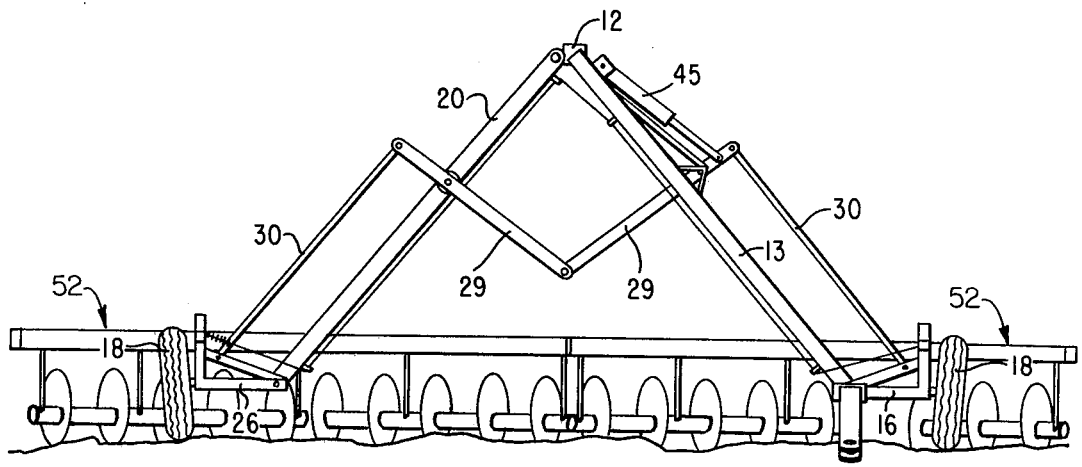
Figure 3:
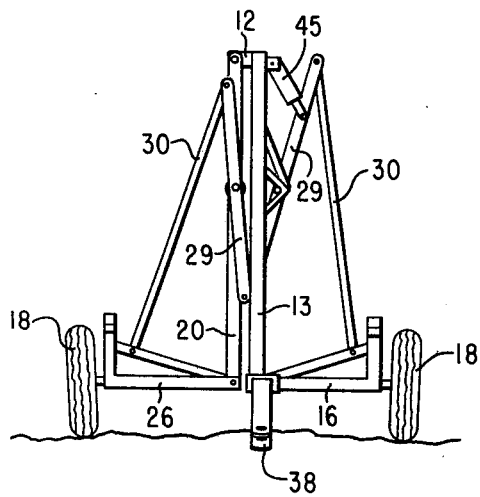
Figure 4:
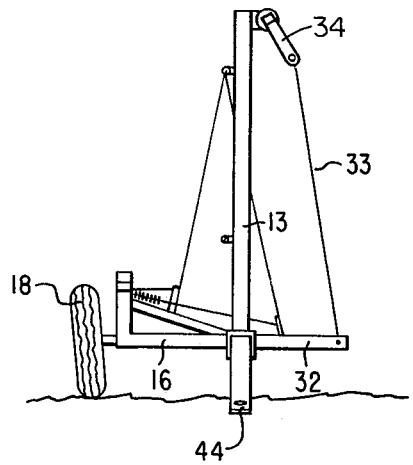
Figure 5:
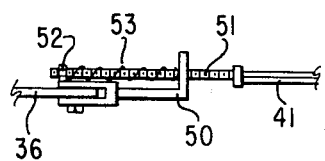

FIG. 1 is a top plan view of the framework of my device in the unfolded or open conformation showing a diagrammatic indication of the implement being pulled, FIG. 2 is a front elevational view of the device as shown in FIG. 1, FIG. 3 is a view similar to FIG. 2 of the device in its collapsed conformation, FIG. 4 is a rear elevational view of the device as shown in FIG. 3, and FIG. 5 is a detailed view of a spring safety device in the steering mechanism.

DESCRIPTION

Briefly my invention comprises a foldable framework having a hinge-like action. The axis of the hinge lies in the longitudinal direction and the folding is done between the open and closed position about that axis. The discs are attached to opposite parts of the opening hinge so that they are spaced laterally when the hinge is open and follow each other without lateral spacing when the hinge is closed. Interconnected steerable wheels are provided, both front and back, so that the device trails well in the transport mode.

More specifically, and referring to the drawings, I provide a longitudinal member 10 having a parallel reinforcement member 11 attached to it by transfer members 12. Vertically extending leg members 13 are fixed to the main member 10 both at the front and rear. Braces 14 adapted to brace and strengthen the legs 13 are fixed between the lower end of the leg 13 and the reinforcement member 11. Thus, a fairly rigid framework is provided with two permanently attached legs.

At the lower end of each of the legs I provide a triangular framed axle carrier 16 which is pivotally attached to the leg 13. This carrier may also be braced by a brace member 17. The pivotal axis for the carrier 16 is longitudinal and therefore allows the wheel 18 to be tilted relative to the frame.

A third support from the ground is necessary to provide a stable tractible structure. That third support is accomplished by a leg 20 supported by a brace 21. These two members are fixed to a rod or tube 22 journalled in sleeves 23 fixed to the main member 10. Thus it is possible to swing the leg 20 adjacent to the front leg 13 as shown in FIG. 3 or to spread them as shown in FIG. 2 simply by pivoting the member 22 in its bearings. A chain 24 or similar device may be used to limit the open position although my other controls should also accomplish that.

The axle carriers 16 on the main legs 13 have a counterpart carrier 26 on the movable leg. This carrier is also pivoted to the leg. The purpose of the pivotal attachment is to keep the wheels 18 carried by each of the carriers in a position close to vertical so that the tires will run properly. This position is assured by a pantograph type arrangement built on the front end for the front wheels. The structure includes auxiliary bars 29 pivoted to the front legs 13 and 20 and pivoted to each other to form a collapsing quadrilateral approaching a parallelogram. Each of the bars 29 extends beyond its leg and carries a control member 30 pivotally connected to the extended bar and to the axle carriers 16 and 26. Thus, as the frame opens to the position shown in FIG. 2, the bar 29 forces the member 30 downward to press the axle carriers 16 and 26 to open away from the legs 13 and 20. Conversely, as the frame collapses to the position shown in FIG. 3, the axle carriers 16 and 26 are drawn upward to a position approximately perpendicular to the legs 13 and 20.

The rear wheel 18 is also mounted on an axle carrier 16 pivoted to its leg 13. However, in this case, I prefer to extend the carrier beyond the pivot, forming a lever 32. Because there is almost always weight pressing on the rear wheel, I can then use a cable 33 to hold the wheel in place. Control of the pivoting of this wheel 18 is provided through a crank arm 34 fixed to the tube 22. Thus, as the front leg 20 is pivoted outward, the tube 22 turns the crank arm 34 relative to the other structure, and either pulls or relaxes the cable 33 thus changing the position of the rear wheel 18 through the lever 32.

Steering of the entire device is accomplished by using axles pivoted to the carriers 16 and 26 on a substantially vertical axis in a manner well known in the art. Each axle is controlled by a cross beam 36 (FIG. 1) fixed to the axle member. The wheel 18 at the main front leg 13 is controlled though a link 37 connected between that cross beam 36 and the tongue 38 by which the device is pulled. By use of the parallelogram arrangement, lateral movement of the tongue 38 is transmitted to the cross beam and results in turning the wheel 18 in the direction to follow that in which the tongue 38 is pulled. By properly rigging wire ropes or cables 40, the opposite wheel 18 in front is also turned in the same direction. I also provide for wire ropes 41 to run along the reinforcement member 11 and to the rear cross member 36 to provide also for steerability of that wheel 18.

To provide for absorbing some of the road shock and to allow fairly tight rigging of the steering cables, I provide a spring loaded safety mechanism 42 best shown in FIG. 5. The connection to the cross beam 36 is by means of a right angle device 50 pivoted to the beam. The cable 41 has attached to it a threaded rod 51 which extends through the upright leg of the angle. A nut 52 is threaded onto the rod and may be held in place by jam nut or other convenient method of preventing the nut from turning on the rod. A compression spring 53 is engaged between the nut 52 and the upright leg of the angle 50 so that shocks can be absorbed by the spring and so that proper tension may be kept in the steering cables.

The entire structure is provided so that discing implements—customarily tandem discs 52 having tongues 53—can be used in connection with the machine. Therefore, I provide a front drawbar device 43 fixed to the front leg 20. A similar rear drawbar 44 is fixed to the rear leg 13. It will be obvious that when the device is spread as shown in FIGS. 1 and 2, the discs will be laterally spaced by the lateral distance between the drawbars. As the framework is collapsed toward the position shown in FIG. 3, the lateral spacing declines and when fully collapsed that spacing approaches full alignment.

Control of the opening or closing of the frame may be readily accomplished by means of the hydraulic system on most farm tractors. That system may be connected through proper controls to a hydraulic cylinder and piston assembly 45 connected between the main frame and the extension of one of the members 29, or between other similar points.

Because nearly all discs have hydraulically operated lifting mechanisms, I also provide for use of those mechanisms. This is easily accomplished by running hydraulic lines 46 from the tractor (not shown) through suitable controls 47 and then through additional lines 48 to connecting points 49 near each drawbar. In normal use in the field, the frame is spread to the positions shown in FIGS. 1 and 2. The disks 52 are then pulled so that one is offset from the other by about the width of the swath covered by the disk. In that condition, the actual width of the row of earth being worked is substantially twice that of an individual disk 52. This width, it is obvious, is far too wide for transport of the device on a road or lane.

When it is necessary to move the device on a road or lane, it is necessary to collapse the framework to the position shown in FIG. 3. In that position the disks 52 trail one right behind the other. Each of the disks will normally have a lift mechanism as noted above. These mechanisms can be actuated by the hydraulic system through the lines 46 to raise the blades of the disk out of the ground before collapsing the frame and during transport so that the device can be readily pulled.

It is apparent that I have provided a device which will work a wide row of earth on each pull across a field and can still be transported along a road in a narrow conformation suitable for such movement.

I claim:

1. A device adapted to trail two farm implements on varying paths comprising a framework, wheels on said framework adapted to make it readily transportable, said framework comprising two parts hingedly connected on a longitudinal hinge line, drawbar means on each of said two parts whereby the lateral spacing of said drawbars can be varied by opening and closing of said hinged parts, said drawbars being connectable to said implements.

2. The device of claim 1 in which said wheels are steerable.

3. The device of claim 1 in which said framework includes a front and rear leg on one part and a single leg on the other part, each of said wheels being mounted on each leg.

4. The device of claim 3 in which said wheels are mounted on axle carriers, said axle carriers being pivotally mounted on said legs and means connected between said axle carriers and said framework to keep said wheels in a substantially vertical position as said framework is opened and closed.

5. The device of claim 4 in which all of said wheels are steerable, means interconnecting said wheels to steer them in unison.

6. The device of claim 3 in which power means is connected between parts of said framework to provide power operated opening and closing of said hinged parts.

7. The device of claim 5 in which shock absorbing means is provided as part of said means interconnecting said wheels.

8. The device of claim 4 in which said means to keep the wheel vertical includes pantograph-like means connected between opposite legs on separate parts of said hinged parts and includes crank and lever means on the third leg.

9. The device of claim 4 in which hydraulic connection means is provided adjacent each drawbar means.

* * * * *